United States Patent [19]
Ahmadi et al.

[11] Patent Number: 5,233,604
[45] Date of Patent: Aug. 3, 1993

[54] METHODS AND APPARATUS FOR OPTIMUM PATH SELECTION IN PACKET TRANSMISSION NETWORKS

[75] Inventors: Hamid Ahmadi, Somers; Jeane S. Chen, Briarcliff Manor; Chee-Seng Chow, Ossining; Roch Guérin, Yorktown Heights, all of N.Y.; Levent Gün, Durham, N.C.; Anthony M. Lee, White Plains, N.Y.; Theodore E. Tedijanto, Cary, N.C.

[73] Assignee: International Business Machines Corporation, Armonk, N.Y.

[21] Appl. No.: 874,917

[22] Filed: Apr. 28, 1992

[51] Int. Cl.$^5$ .......................................... H04L 12/56
[52] U.S. Cl. .................................... 370/60; 370/94.3
[58] Field of Search ............... 370/54, 58.1, 60, 60.1, 370/79, 84, 94.1, 94.3; 340/825.03, 827

[56] References Cited

U.S. PATENT DOCUMENTS

| | | | |
|---|---|---|---|
| 4,827,411 | 5/1989 | Arrowwood et al. | 364/300 |
| 5,081,620 | 1/1992 | Girard et al. | 370/84 |
| 5,115,433 | 5/1992 | Baran et al. | 370/94.3 |
| 5,142,531 | 8/1992 | Kirby | 370/94.3 |

OTHER PUBLICATIONS

*Dynamic Programming: Deterministic and Stochastic Models*, D. P. Bertsekas, pp. 318–322, Prentice-Hall, Englewood Cliffs, N.J., 1987.

*Data Networks*, D. P. Bertsekas and R. Gallager, pp. 315–322, Prentice-Hall, Englewood Cliffs, N.J. 1987.

*Primary Examiner*—Benedict V. Safourek
*Attorney, Agent, or Firm*—Gerald R. Woods

[57] ABSTRACT

A packet communications system utilizes a route determining mechanism by identifying principal paths between the source and the destination in the system. Principal paths are minimum hop count paths with a transmission delay less than a specified threshold. Principal path links are accepted as legs of the optimum path, if feasible, i.e., if the resulting load on the link is less than a specified principal threshold. Secondary links are accepted only if the resulting load on the link is less than a specified secondary threshold, where the secondary threshold is less than the principal threshold. All paths must also have a transmission delay less than a specified threshold. Each request for a route includes the source node, the destination node, the load required, the maximum transmission delay and, if desired, the quality of service parameters which all of the legs of the route must satisfy. A modified Bellman-Ford breadth-first search algorithm is used to identify the principal links and, using these principal link identifications, determining the optimum path.

15 Claims, 6 Drawing Sheets

PATH DETERMINATION PROCEDURE

COMMUNICATIONS NETWORK

NETWORK LAYER HEADER

TYPICAL PACKET DECISON POINT

TOPOLOGY DATABASE
LINK CHARACTERISTICS DATA

| CHARACTERISTIC | | LINK VALUES | | | |
|---|---|---|---|---|---|
| E | DESCRIPTION | A | B | — | N |
| | Load Threshold If Principal Link | $c_{A,P}$ | $c_{B,P}$ | --- | $c_{N,P}$ |
| | Load Threshold If Secondary Link | $c_{A,S}$ | $c_{B,S}$ | --- | $c_{N,S}$ |
| (L) | Total Allocated Load | $\hat{c}_A$ | $\hat{c}_B$ | --- | $\hat{c}_N$ |
| QOS | Quality of Service Parameters | $QOS_A$ | $QOS_B$ | --- | $QOS_N$ |

PATH DETERMINATION PROCEDURE

PHASE I
MARK LINKS AS PRINCIPAL OR SECONDARY

PHASE II
DETERMINE OPTIMUM PATH

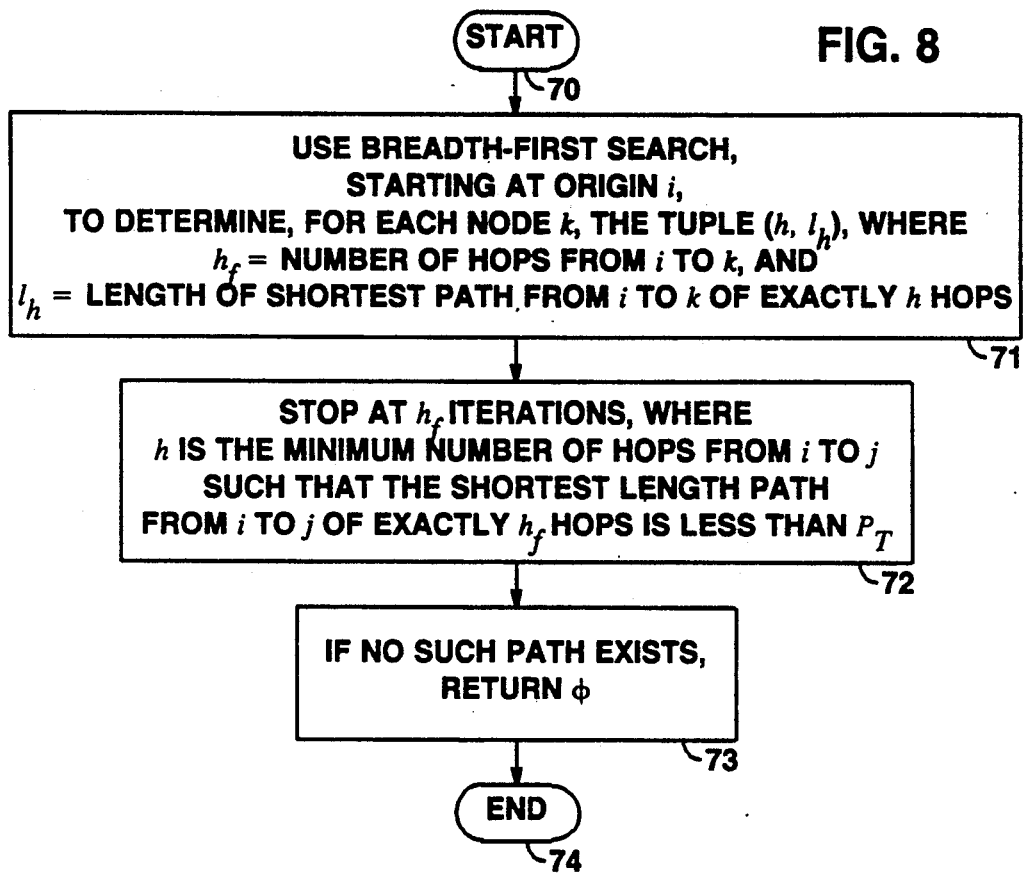
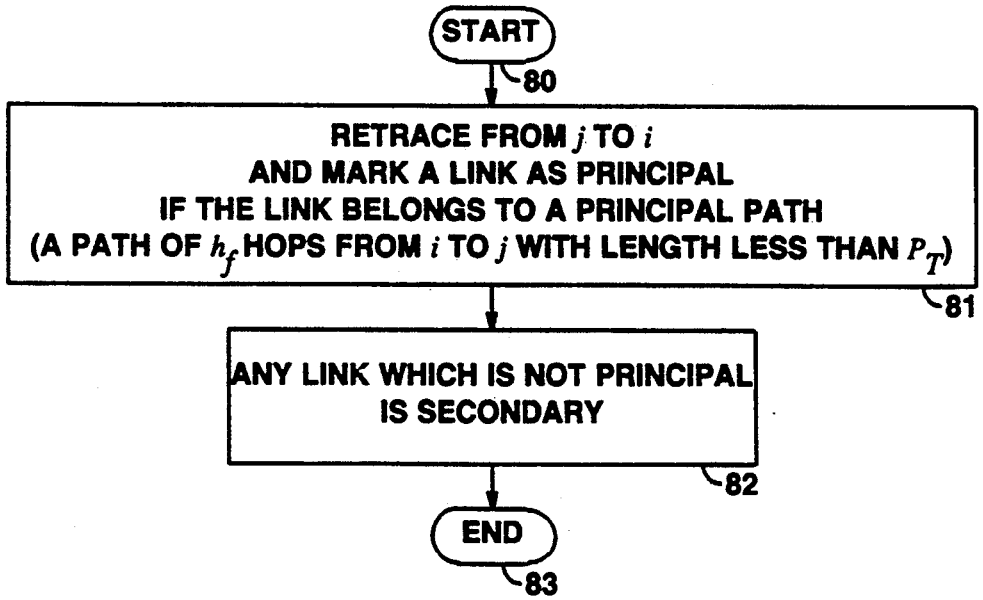

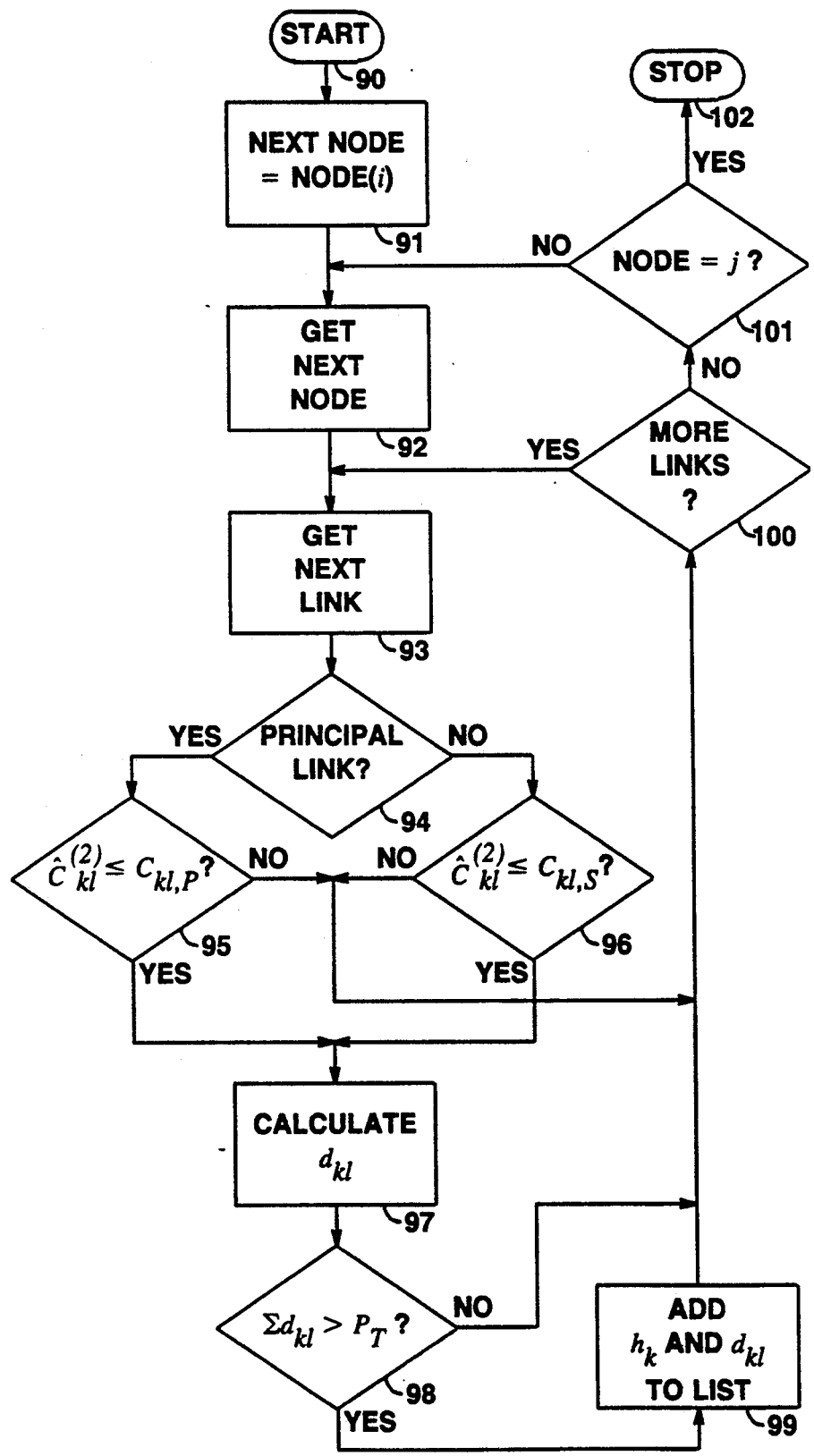

METHODS AND APPARATUS FOR OPTIMUM PATH SELECTION IN PACKET TRANSMISSION NETWORKS

TECHNICAL FIELD

This invention relates to packet transmission systems and, more particularly, to optimum path selection for connections between two nodes in such systems.

BACKGROUND OF THE INVENTION

It has become increasingly useful to interconnect a plurality of data processing elements by means of a packet switching network in which data is transmitted as data assemblages called "packets." Such networks include a plurality of interconnected network switching nodes which, in turn, are connected to end nodes supporting the data processing equipment. Such packet networks can become quite large with an extensive geographical distribution. In such a situation, the selection of an efficient path between two end nodes which wish to communicate with each other becomes of paramount importance.

The major criteria for selecting paths between nodes in packet networks are minimum hop count and minimum path length. The hop count is the number of links used to construct the path between the two end nodes. The path length is a function of the overall transmission delay imposed by the path between the two end nodes. In most high speed networks, the delay (path length) is not a major consideration since the worst-case delay through such networks is nearly always acceptable. The hop count, however, is a direct measure of the amount of resources required to implement a given path and hence is of considerable importance in selecting paths.

It is to be noted that a selected path need not be a minimum hop count path since congestion on the network links may force the choice of a larger hop count path. However, such longer alternate paths cannot be allowed to grow without limit since inordinate amounts of network resources might be committed to the one path, resulting in further congestion for other paths and forcing yet longer hop count paths to be selected for yet other connections. The long term network throughput could thereby be adversely affected.

The problem, then, is to select a path between an origin node and a destination node which has a minimum hop count, a minimum path length, and which does not utilize an inordinate amount of network resources.

SUMMARY OF THE INVENTION

In accordance with the illustrative embodiment of the present invention, optimum paths between origin and destination nodes in a packet network are selected by a modification of the so-called "Bellman-Ford algorithm," a shortest path on a weighted graph algorithm taught by D. P. Bertsekas in *Dynamic Programming: Deterministic and Stochastic Models*, pages 318-322, Prentice-Hall, 1987, Englewood Cliffs, N.J., and D. P. Bertsekas and R. Gallager in *Data Networks*, pages 315-332, Prentice-Hall, 1987, Englewood Cliffs, N.J.. More particularly, the algorithm of the present invention defines "principal paths" between any given origin-destination pair. A principal path is defined as a feasible minimum-hop count path and principal links are defined as links in a principal path. All other links are defined as secondary links. Secondary paths are paths including at least one secondary link and including more than the minimum-hop count.

A principal path is accepted as a route if none of its principal links is saturated, i.e., exceeds its preassigned traffic load. A secondary path, however, is accepted as a route only if none of its principal links, if any, is saturated and if the load levels on its secondary links are below a preselected threshold (typically lower than that for links designated as principal). If this load threshold is exceeded on any of the secondary links, the secondary path is rejected as a route.

One advantage of the path selection technique of the present invention is that a maximum path length constraint can be imposed on the path selection process. That is, feasible paths can be tested to determine if the path length constraint has been exceeded and rejected if the constraint is exceeded. Such constraints can be used to prohibit inordinate resource consumption in implementing a route and can also be used to impose specific grade of service requirements such as avoidance of low speed links. For this reason, the path length constraints must typically be specified for each connection request, and the principal links determined separately for each connection request.

In summary, the route selection technique of the present invention involves two phases. In the first phase, the principal links are identified for the requested connection. If no maximum length constraint is imposed, the principal links between any two nodes of the network can be precomputed and stored for use in the second phase of the algorithm. If a maximum length constraint is imposed, the principal links must be calculated for each new connection request, comparing each link length with the constraint, or the constraint decreased by the previously accepted principal link lengths.

The route determination technique of the present invention has the advantages of producing optimum paths between arbitrary nodes of a packet switching system, taking into account not only the hop count and the path length, but also imposing a maximum ceiling on the path length. In addition, the computation of optimum paths is sufficiently rapid that a path computation can be made for each request for a connection.

BRIEF DESCRIPTION OF THE DRAWINGS

A complete understanding of the present invention may be gained by considering the following detailed description in conjunction with the accompanying drawings, in which:

FIG. 8 is a yet more detailed flow chart of Routine A of the Phase I portion of the procedure of FIG. 5;

FIG. 9 is a yet more detailed flow chart of Routine B of the Phase I portion of the procedure of FIG. 5; and FIG. 10 is a detailed flow chart of the search algorithm used in Routine A of FIG. 8.

To facilitate reader understanding, identical reference numerals are used to designate elements common to the figures.

DETAILED DESCRIPTION

Figure 1:
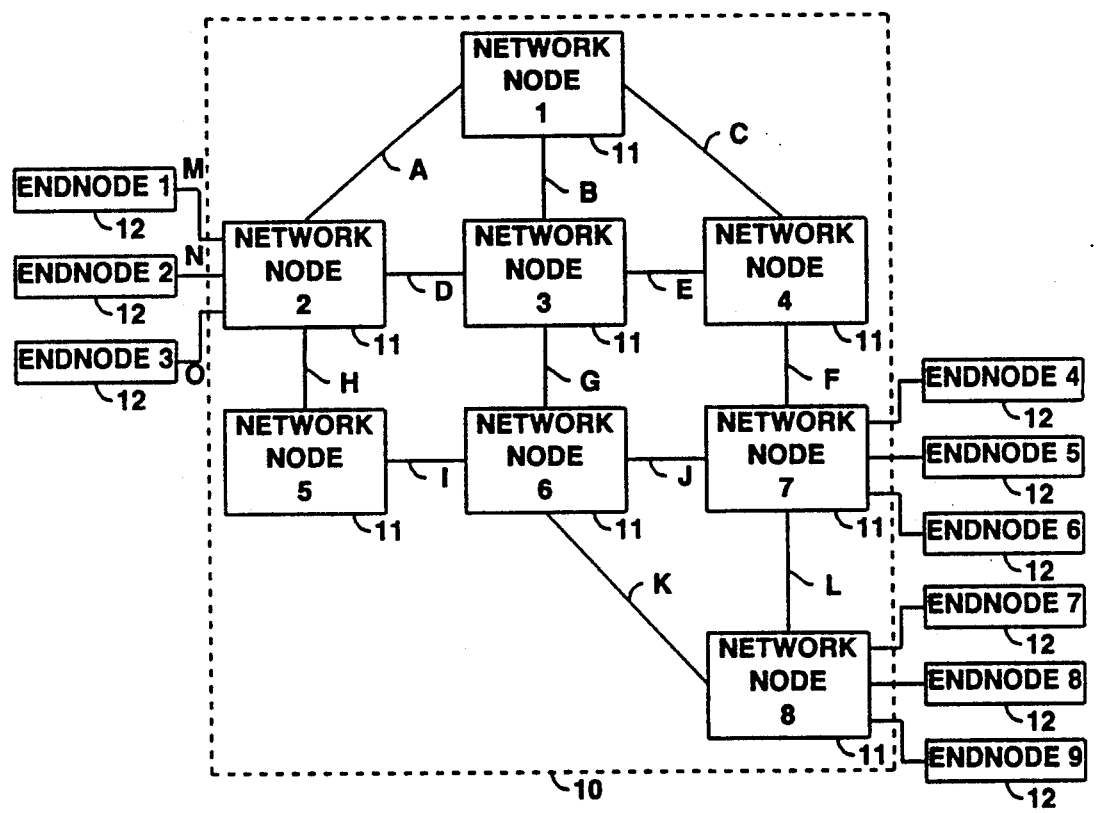
FIG. 1 shows a general block diagram of a packet communications network in which the route determination system of the present invention might find use.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 each comprise a data processing system which provides data communications services to all connected nodes, network nodes and end nodes, as well as decision points with the node. The network nodes 11 each comprise one or more decision points within the node, at which incoming data packets are selectively routed on one or more of the outgoing communication links terminated within that node or at another node. Such routing decisions are made in response to information in the header of the data packet. The network node also provides ancillary services such as the calculation of routes or paths between terminal nodes, and providing directory services and maintenance of network topology data bases used to support route calculations.

Figure 2:
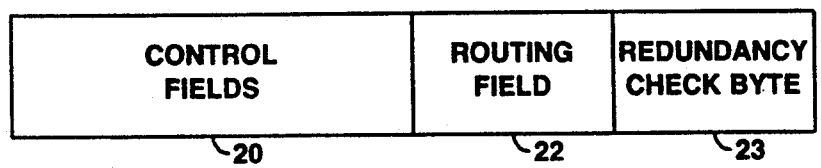
FIG. 2 shows a graphical representation of the header of a data packet which might be transmitted on the packet communications network of FIG. 1.

Each of end nodes 12 comprises either a source of digital data to be transmitted to another end node, a utilization device for consuming digital data received from another end node, or both. Users of the packet communications network 10 of FIG. 1 utilize an end node device 12 connected to the local network node 11 for access to the packet network 10. The local network node 11 translates the user's data into packets formatted appropriately for transmission on the packet network of FIG. 1 and generates the header which is used to route the packets through the network 10. The header has the general form shown in FIG. 2 and includes control fields 20, a routing field 22 and a redundancy check byte 23. The routing field 22 contains the information necessary to route the packet through the packet network 10 to the destination end node 12 to which it is addressed.

Figures 3, 4:
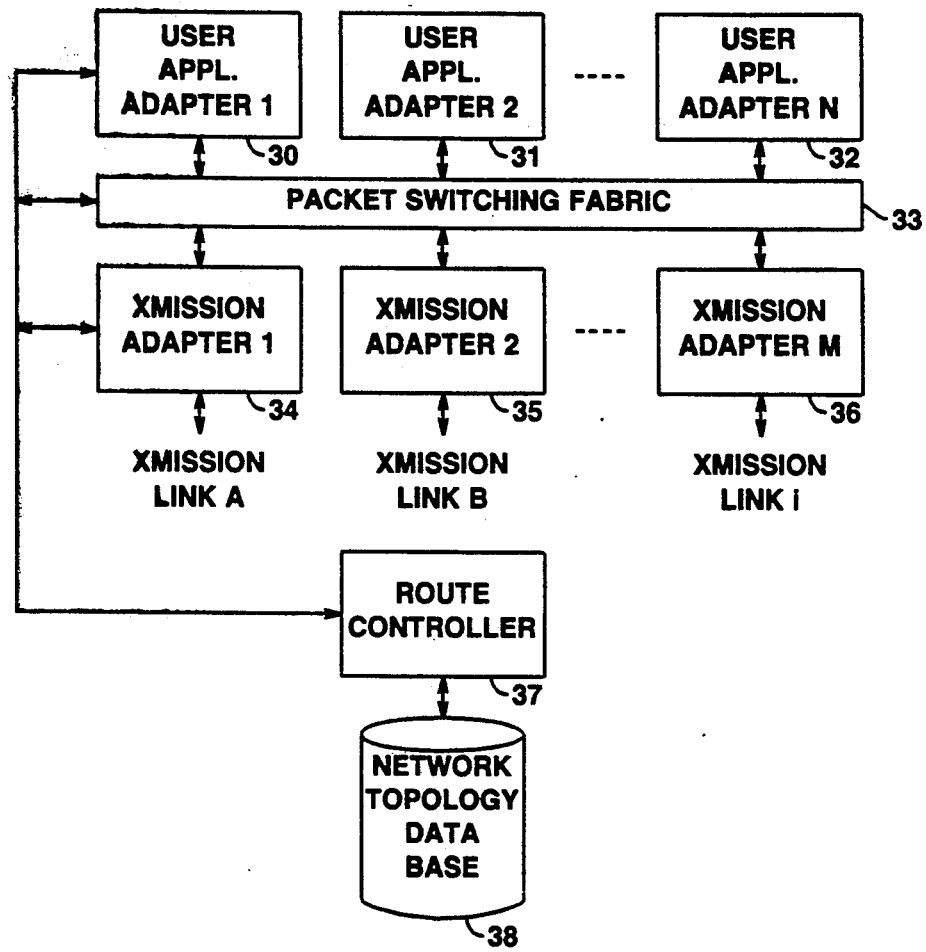
FIG. 3 shows a block diagram of a typical decision point at the entry point for packets entering the network of FIG. 1.
FIG. 4 shows in tabular form a portion of the topology data base in each decision point such as that shown in FIG. 3 and which is used to calculate optimum paths.

In FIG. 3 there is shown a general block diagram of a typical packet network decision point such as is found in the network nodes 11 of FIG. 1. The decision point of FIG. 3 comprises a high speed packet switching fabric 33 onto which packets arriving at the decision point are entered. Such packets arrive over transmission links via transmission adapters 34, 35, ..., 36, or originate in user applications in end nodes via application adapters 30, 31, ..., 32. It should be noted that one or more of the transmission adapters 34-36 can be connected to intranode transmission links connected to yet other packet switching fabrics similar to fabric 33, thereby expanding the switching capacity of the node. The decision point of FIG. 3 thus serves to connect the packets arriving at the decision point to a local user (for end nodes) or to a transmission link leaving the decision point (for network nodes and end nodes). The adapters 30-32 and 34-36 may include queuing circuits for queuing packets prior to or subsequent to switching on fabric 33. A route controller 37 is used to calculate optimum routes through the network for packets originating at the decision point of FIG. 3. A topology data base 38 contains information about all of the nodes and transmission links of the network of FIG. 1 which information is used by controller 37 to calculate optimum paths.

The route controller 37 of FIG. 3 may comprise discrete digital circuitry or may preferably comprise properly programmed digital computer circuits. Such a programmed computer can be used to generate headers for packets originating at user applications in the decision point of FIG. 3 or connected directly thereto. The information in data base 38 is updated when new links are activated, new nodes are added to the network, when links or nodes are dropped from the network or when link loads change significantly. Such information originates at the network node to which the resources are attached and is exchanged with all other nodes to assure up-to-date topological information needed for route calculation. Such data can be carried on packets very similar to the information packets exchanged between end users of the network.

The incoming transmission links to the packet decision point of FIG. 3 may comprise links from local end nodes such as end nodes 12 of FIG. 1, or, links from adjacent network nodes 11 of FIG. 1. In any case, the decision point of FIG. 3 operates in the same fashion to receive each data packet and forward it on to another local or remote decision point as dictated by the information in the packet header. The packet network of FIG. 1 thus operates to enable communication between any two end nodes of FIG. 1 without dedicating any transmission or node facilities to that communication path except for the duration of a single packet. In this way, the utilization of the communication facilities of the packet network is optimized to carry significantly more traffic than would be possible with dedicated transmission links for each communication path.

In FIG. 4 there is shown in tabular form a portion of the information stored in the data base 38 of FIG. 3. As can be seen in FIG. 4, a number of different characteristics of each link in the network is stored in the data base. For the purposes of the present invention, only a few of these characteristics will be discussed. As might be expected, one of the critical characteristics of the transmission links is the load threshold available on that link. Moreover, it is well known that such transmission facilities can only be loaded up to a fraction of their theoretical maximum load if reasonable transmission properties are to be maintained. The load threshold of such a transmission facility can be represented by the quantity $C_{kl}$, the effective load capability of the transmission link between nodes k and l. For reasons to be discussed hereinafter, two different load thresholds are defined for each transmission links, depending on whether the link is selected as a principal link in a route or as a secondary link in the route. A principal link is defined as a leg of a principal path where a principal path is a feasible minimum hop count path between the originating node and the destination node. The hop count is simply the number of transmission links in the path. All other links are defined to be secondary links. Any non-minimum hop count path between the originating node and the destination node is called a secondary path and it always includes at least one secondary link. In accordance with the present invention, a principal path is preferred over a secondary path in determining optimum routes between nodes. If, however, a principal path is not available due to its already being fully loaded, a secondary path can be chosen. In order to discriminate against such a secondary path, a load threshold is defined for each secondary link which is less than the corresponding principal load threshold for that same link. Thus the table of FIG. 4 includes two different load thresholds for each transmission link, one to be used if the link is a principal link in a route being calculated and the other to be used in the link if a secondary link in the route being calculated.

Also shown in the table of FIG. 4 is the Total Allocated Load, T(AL), for each link. This value represents the total load which has already been allocated for this transmission link due to previously calculated routes. If the difference between this already allocated load and the total available principal or secondary load of the channel (depending on the whether the link is a principal link or a secondary link) is not sufficient to carry the new connection, then the link cannot be selected. In accordance with the present invention, in addition a path can be selected only if the overall path delay does not exceed a maximum delay defined as $P_T$. In order to calculate the incremental delay introduced by this link, $d_{kl}$, the following formula can be used, using the values show in the table of FIG. 4:

$$d_{kl} = \frac{C_{kl}}{(C_{kl} - \hat{C}_{kl}^{(1)})(C_{kl} - \hat{C}_{kl}^{(2)})} \quad (1)$$

where
$C_{kl}$ = Total Bandwidth of Transmission Link from Node k to l,
= $C_{kl,P}$ (FIG. 4) if the link is a principal link, or
= $C_{kl,S}$ (FIG. 4) if the link is a secondary link,
$\hat{C}_{kl}^{(1)}$ = Allocated Bandwidth Before This Connection, and
$\hat{C}_{kl}^{(2)}$ = Allocated Bandwidth After This Connection.

To support the calculation of equation (1), the topology data base 38 contains, for each link, not only the load threshold (e.g., $C_{kl,P}$ and $C_{kl,S}$), but also the currently allocated load for each transmission link (e.g., $\hat{C}_{kl}$). The definition of the incremental delay given in equation (1) is for illustration purposes only and many other formulations can be used. This incremental delay is subtracted from the maximum delay to produce a new maximum delay available for future links in the selected route.

In addition to the bandwidth information discussed above, the topological data base 38 of FIG. 3 and illustrated in FIG. 4 includes so-called "Quality Of Service (QOS)" parameters. Such QOS parameters can be specified in a particular request for an optimum route and the present invention operates to insure that all of the selected links in the path conform to the requested QOS parameters. Such QOS parameters may include, for example, a particular security level, a maximum propagation delay or a minimum probability of buffer overflow.

In accordance with the present invention, the total amount of delay permitted for each route has the finite limit $P_T$. This limit is imposed to avoid excessive delay and to prevent the dedication of an undue amount of resources to any one connection. Without such a limitation, it is possible to create an unstable condition where the resources of the packet communications system are rapidly used up in increasingly more complex long paths. That is, the use of excessive amounts of resources for one route leaves less resources available for other routes, requiring even greater resources for future routes.

If no limitation is put on the maximum delay permitted for each route, it is possible to calculate all principal paths and principal links between any two nodes ahead of time and merely access them from a stored table when the route determination is done. In order to accommodate a finite limitation on path delay, however, it is necessary to determine the principal paths, and hence the principal links, for each new route request.

In accordance with the present invention, each request for a route determination includes the following input parameters:
Origin Node (i)
Destination Node (j)
Required Bandwidth (c)
Maximum Path Length Threshold ($P_T$)
Quality of Service Parameters (QOS), Optional Using these parameters, a path is determined by first searching through all links to determine minimum hop count path that satisfy the maximum path length constraint $P_T$ and then backtracking to derive a list of principal links. This search is supplemented by accumulating the link delays for each path. Once the destination node is reached, minimum hop count principal paths are backtracked to create a list of principal links. This principal link list is used in the second phase of the algorithm to determine the optimum path from the source to the destination node. This specific procedure for determining paths through a packet communications system will be described with reference to the balance of the figures.

Figure 5:
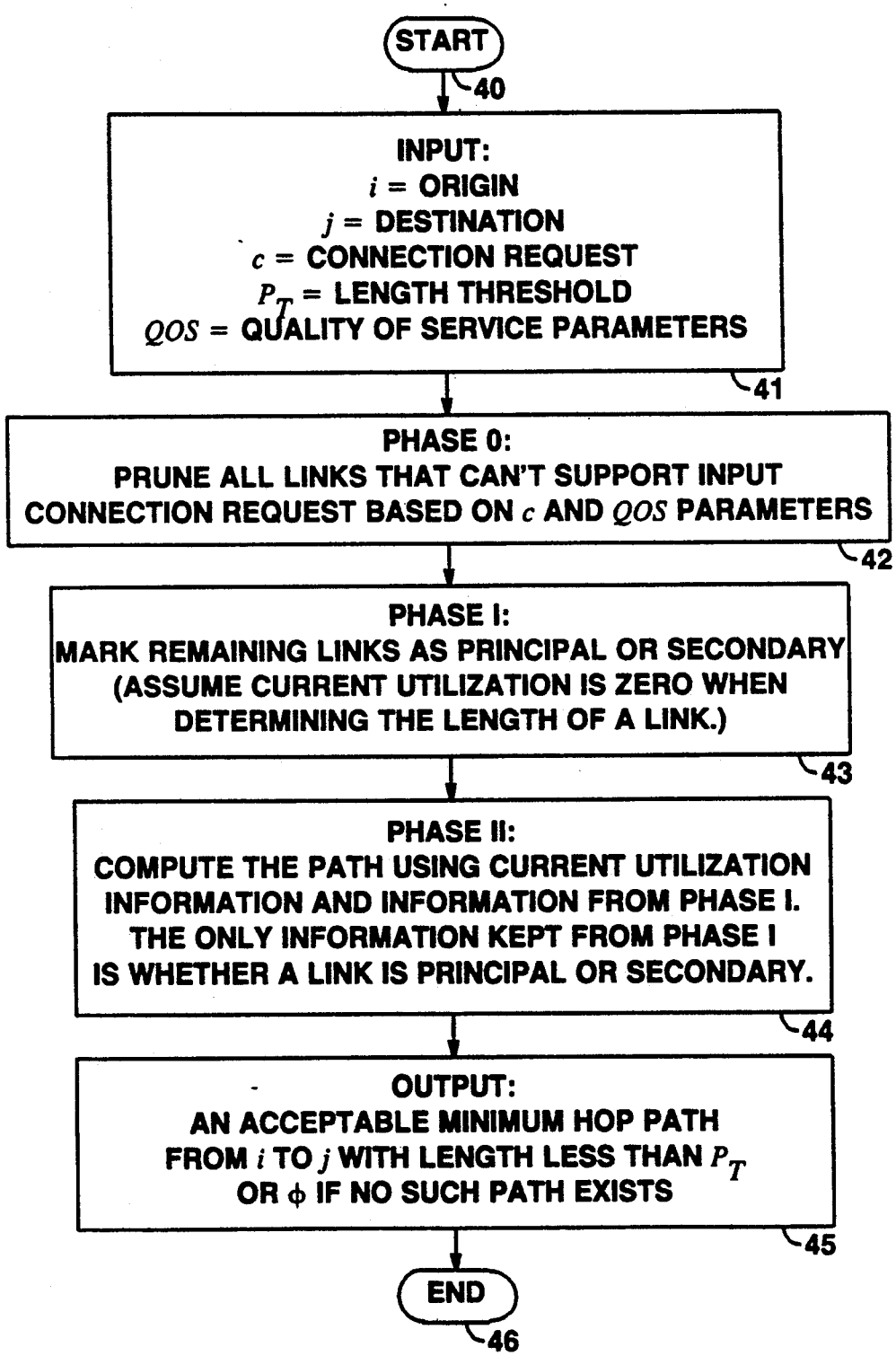
FIG. 5 shows a general flow chart of the path computation procedure of the present invention.

In FIG. 5, there is shown a general flow chart of the path computation procedure of the present invention. Starting at start box 40, input box 41 is entered to specify the inputs required to calculate an optimum route in accordance with the present invention. As noted above, these input parameters include the originating node i, the destination node j, the requested connection bandwidth c, the maximum path length $P_T$ and, optionally, a group of "quality of service" parameters QOS. With these inputs, box 42 is entered where, as Phase O, the list of links in the network is pruned by removing all links which do not meet the QOS parameters. With this decimated list of transmission links, Phase I box 43 is entered to identify the principal links. In determining the lengths of the transmission links in this process, it is assumed that the utilization of each link is zero ($\hat{C}_{kl}=0$), i.e., the entire bandwidth of the link is available. The process used to search the network for principal paths is a modification of the so-called Bellman-Ford algorithm described at pages 318-322 of *Dynamic Programming: Deterministic and Stochastic Models*, D. P. Bertsekas, Prentice-Hall, 1987, Englewood Cliffs, N.J. This algorithm will be described in detail hereinafter Once the principal paths have been identified in box 43, Phase II box 44 is entered where the optimum path is identified, using the principal paths from box 43, and using the current utilization data (allocated bandwidth $\hat{C}_{kl}$). As noted in box 45, the output from box 44 is an acceptable minimum hop count path from the originating node i to the destination node j which has the minimum possible hop count and which path length is less than the input maximum of $P_T$. If no such path exists, an failure signal $\phi$ is returned. The process ends in terminal box 46.

Figure 6:
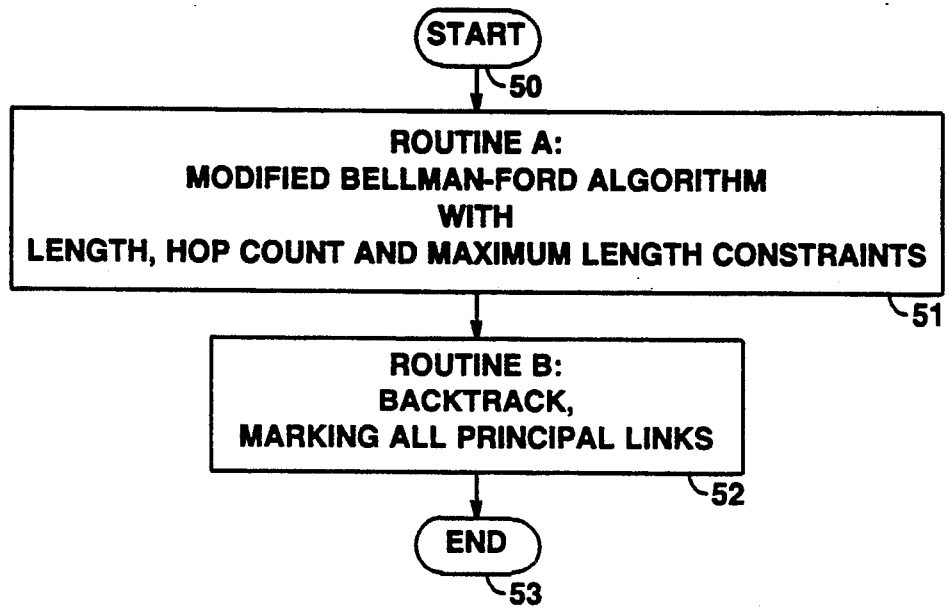
FIG. 6 shows a more detailed flow chart of Phase I of the procedure of FIG. 4.

In FIG. 6 there is shown a more detailed flow chart of Phase I of the flow chart of FIG. 5 in which the links of the packet communications system of FIG. 1 are marked as principal or secondary for this particular request. As noted, in box 51 Routine A utilizes a modified Bellman-Ford algorithm to search all of the links between the origin and the destination nodes, keeping track of the hop count and the path length increment for each link. Once the destination node is reached, box 52 is entered where Routine B backtracks through the links to discover the paths with both a minimum hop count and a length that satisfies the maximum path length constraint $P_T$. These paths are principal paths and all of the links in these paths are principal links. All other links are secondary links. Only the information as to whether the link is principal or secondary is retained for use in Phase II of the procedure.

Figure 7:
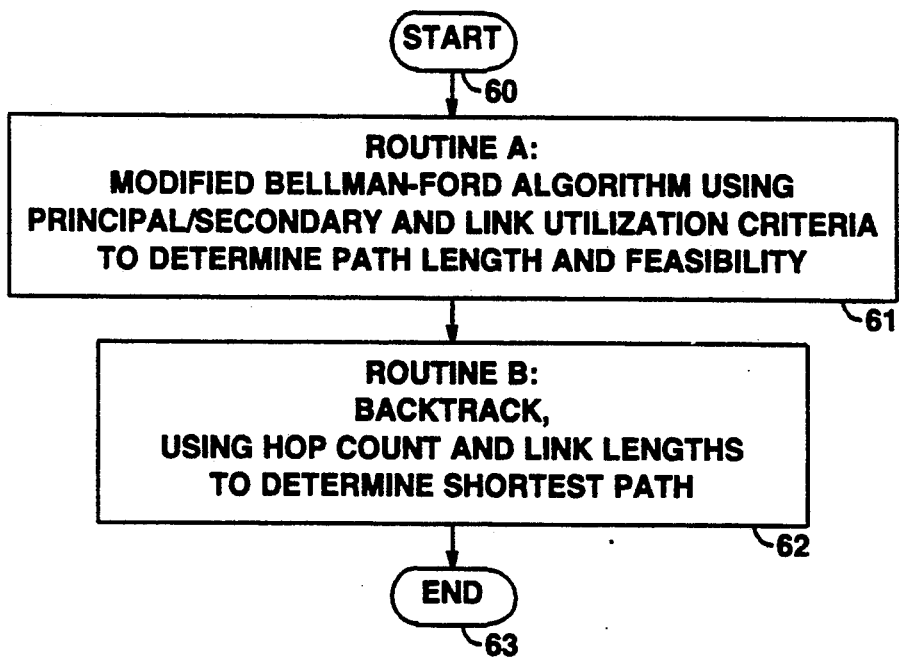
FIG. 7 show a more detailed flow chart of Phase II of the procedure of FIG. 4.

In FIG. 7 there is shown a more detailed flow chart of Phase II of the flow chart of FIG. 5 in which the optimum path is computed. Starting in start box 60, box 61 is entered where Routine A, essentially identical to Routine A in FIG. 6, uses the same modified Bellman-Ford algorithm to determine the feasibility and the link length for each possible link in the ultimate path. Primary links are accepted as feasible providing only that load capacity is available for the new connection, i.e., $\hat{C}_{kl}^{(2)}$ does not exceed the principal link load threshold $C_{kl,P}$. Secondary links are accepted as feasible provided that adding the new connection does not result in exceeding the secondary link load threshold $C_{kl,S}$. Links are accepted as feasible only if the incremental increase in path length caused by the link does not increase the total path length so that it is greater than the specified maximum path length $P_T$. In box 62, the list of feasible links are backtracked through using the hop count and the path lengths to find the shortest path with the minimum hop count. The process of FIG. 7 ends in terminal box 63.

In FIG. 8 there is shown a more detailed flow chart of Routing A used in FIGS. 6 and 7. When used in FIG. 6 to identify the principal links, the flow chart of FIG. 8 starts in box 70 from which box 71 is entered where a breadth-first exhaustive search is made, starting at the origin node i. That is, each link from each node is followed to the next node where each link is again followed to the next node, and so forth. For each node k encountered in this search, the minimum hop count ($h_k$) from the origin node to node k is saved along with the length ($l_k$) of the shortest path from the origin to node k only if the length is less than $P_T$. When the destination node is reached in this search, in box 72, the hop count $h_f$ is the minimum hop count from i to j such that the shortest path length is less than $P_T$. If no such path exists, box 73 returns a null value of $\phi$. Routine A then terminates in box 74.

In FIG. 9 there is shown a more detailed flow chart of Routine B used in FIGS. 6 and 7. When used in FIG. 6 to identify principal links, the flow chart of FIG. 9 starts in box 80 from which box 81 is entered. In box 81, the path is retraced from the destination node j to the origin node i. Links are marked as principal in this backtracking if the link belongs to a path with minimum hop count and length less than $P_T$. In box 82, links which are not principal are marked as secondary. Box 83 terminates the process.

Returning to FIG. 8, when Routine A is used to calculate the optimum path. The actual utilizations of the links are used to determine whether the links are feasible and the link length. When routine A is completed, a path has been identified with the minimum feasible hop (i.e., a hop count equal to or greater than the minimum hop count $h_f$) and with a length less than $P_T$. In FIG. 9, the hop count and minimum lengths associated with each node are used to identify the actual optimum path.

In FIG. 10 there is shown a detailed flow chart of the modified Bellman-Ford algorithm used to perform the search for an optimum path. In FIG. 10, starting at box 90, box 91 is entered to set the next node to the origin node i. In box 92, the data for the next node is retrieved from the topology data base 38 of FIG. 3. In box 93, the data for the next link leaving that node is obtained from the data base. In decision box 94 it is determined whether or not that link is a principal link. If the link is a principal link, decision box 95 is entered where the accumulated load $\hat{C}_{kl}^{(2)}$ is compared to the link principal threshold $C_{kl,P}$. If the accumulated load is equal to or less than the principal threshold, box 97 is entered to calculate the incremental delay in accordance with equation (1). If the accumulated load is greater than the principal threshold, as determined by decision box 95, the next link is obtained in box 100.

If it is determined in decision box 94 that the link is a secondary link, decision box 96 is entered to compare the accumulated load $\hat{C}_{kl}^{(2)}$ to the link secondary threshold $C_{kl,S}$. If the accumulated load is equal to or less than the secondary threshold, box 97 is entered to calculate the incremental delay in accordance with equation (1). If the accumulated load is greater than the secondary threshold, as determined by decision box 96, the next link is obtained in box 100.

In decision box 98, the accumulated path length up to this point is compared to the maximum path length $P_T$. If the accumulated path length is less than $P_T$, the hop count $h_k$ and the accumulated path length $d_{kl}$ are save in a list in box 99. If the accumulated path length is equal to or greater than $P_T$, box 99 is bypassed and the data for this link is not added to the list. In either case, decision box 100 is then entered to determine if there are any more links exiting from this node. If so, box 93 is entered to get the next link and continue the process. If there are no more links exiting from this node, decision box 101 is entered to determine if the node is the destination node j. If so, the process is complete and terminates in stop box 102. If this node is not the destination node j, box 92 is entered to get the next node and continue the process.

When the procedure of FIG. 10 is complete, a list of the minimum hop counts $h_k$ and the path lengths $d_{kl}$ is available. As discussed above, Routine B then backtracks through this list to identify the path with the minimum path delay as well as the minimum hop count. This is the optimum path to be used in sending the packets involved in the connection through the system of FIG. 1.

When used to identify the principal paths, the flow chart of FIG. 10 is modified to omit the decision box 94. Using the principal load threshold of each link, the minimum hop count and the length of the path to each node encountered is kept on the list. This list can then be processed by backtracking to identify the principal paths (having both minimum hop counts and lengths less than $P_T$). The links of the principal path are the principal links to be used in computing the optimum transmission route. The entire procedure for computing principal links and optimum routes is described in the pseudocode in the attached Appendix. The correspondence between the pseudocode and the flow charts of FIGS. 5 through 10 is obvious and will not be described in detail here.

It should also be clear to those skilled in the art that further embodiments of the present invention may be made by those skilled in the art without departing from the teachings of the present invention.

APPENDIX

Minimum Path Algorithm

The algorithm to be described for computing the best possible path with the minimum possible hop count assumes the availability of a set of all of the principal links between the origin node and the destination node. This principal link list can be precomputed by assuming that the minimum path length is infinity ($P_T = \infty$), or can be computed, as will be described, by utilizing the same algorithm in a phase preceding the path computation phase.

Definitions:

i is the index of the origin node.

j is the index of destination node.

N is the total number of nodes in the network.

h is the step number of the algorithm, equal to the hop count.

$P_T$ is the maximum path length between origin and destination nodes.

$h_f$ is the minimum hop count of a selected path of length less than $P_T$ (if such a path exists).

$d_{kl}$ is the length of the link (if any) between nodes k and l $D_j(l,h)$ is the length of the shortest path between nodes i and j of exactly h hops ($D_j(l,h) = \infty$ if no such path exists). $D_j(l,h)$ can be represented by a (sparse) two-dimensional array, with indices l,h = 0,1, ..., N−1.

A(k,l) is a function that is equal to "1" if the link is acceptable, and "0" otherwise. This function depends on whether the link kl is principal or not.

Note that both of the functions A(k,l) and $d_{kl}$ depend upon the connection request.

The following pseudocode is used to both identify principal links and to compute the best acceptable path. This algorithm is first described to compute the best acceptable path, assuming that the principal links have already been identified. Thereafter, it will be shown how this same algorthm can be used to identify all of the principal links. The inputs to the algorithm are a connection request, the index i of the origin node, the index j of the destination node (i≠j), and the path length acceptance threshold $P_T$. The algorithm will produce an acceptable minimum hop path from i to j with minimum length less than $P_T$, if such a path exists. If no such path exists, the algorithm returns a value of $\phi$.

Best Path Pseudocode

```
                                /*-----Initialization-----*/
for (h = 0;h < N;h++)
{
    for (l = 0;l < N;l++)
    {
        D_j(l,h) = ∞;
```

-continued
Best Path Pseudocode

```
    }
}
D_j(i,0) = 0;
        /*-----Determine Shortest Path From Origin to Destination-----*/
h_f = 0;                /*-----Initialize Final Hop Count to 0-----*/
for (h = 0;h < N;h++)
{
    for (l = 0;l < N;l++)
    {
        /*-----Shortest Path From i to l in (h+1) Hops-----*/
        for (k = 0;k < N;k++)
        {
            if (A(k,l) = 1) then
            {
                D_j(l,h+1) = min[D_j(l,h+1), D_j(k,h) + d_kl]
            }
        }
    }
    if (D_j(j,h+1) < P_T) then
        /*-----Found a Path Within the Threshold P_T-----*/
        h_f = h+1;
        break;
    }
}
if (h_f = 0) then Return φ        /*-----No Path-----*/
/*-----Retrace Selected Shortest Path From Destination
                                            to Origin-----*/
Path = j;
    k = j;
    for (h = h_f − 1;h > 0;h−−)
    {
        for (l = 0;l < 0;l++)
        {
            if (A(l,k) = 1 and D_j(k,h+1) = D_j(l,h) + d_lk) then
            {
                Path = l.Path;
                k = l;
                break;   /*-----See Comment Below-----*/
            }
        }
    }
Path = i.Path;
Return Path;
```

COMMENT: It is assumed that either a single predecessor exists, or the first predecessor is picked when more than one exists. A preferred alternative is to construct a list of all possible predecessors and select one predecessor from the list by a random process.

Principal Link Identification

If the connection request specifies a finite length of the acceptance threshold $P_T$, then the first step must be to determine the principal links associated with this request for a new network connection. The above-described algorithm is used with the following modifications:

A new acceptance function A'(k,l) only checks for links that cannot accomodate the new connection since principal links are not yet known and a special load threshold for non-principal links is meaningless.

The weight of the link kl (without considering existing network traffics) is given by $d'_{kl}$.

It is assumed that A(k,l) ≦ A'(k,l) and that $0 \leq d'_{kl} \leq d_{kl}$ for any link kl.

Retracing the path from the destination to the origin can be omitted.

Computation of $d'_{kl}$ and A'(k,l) assumes that the incoming connection is the only on the link. This eliminates links that are either not capable of carrying the connection, or are part of a path whose length can never be lower than $P_T$.

The output of this algorithm includes not only the hop count $h_f$ and the path length $D_f(j,h_f)$ of the best feasible path between the origin and the destination, but also the length of all lower hop count paths to possible transit nodes. This information is used to identify principal links.

In general, principal links are identified by backtracking from the destination node j, breadth-first and by decreasing the hop count, all computed paths satisfying the length constraint $P_T$. More particularly, 1. Starting with destination j, inspect all adjacent nodes l that are one hop away to determine if they satisfy $D_j(l,h_f-1)+d'_{lj}<P_T$.
2. For each node l satisfying (1), mark the link lj a principal and define a new length threshold $P_T(l)=P_T-d'_{lj}$. By convention, it is assumed that $P_T(j)=P_T$.
3. After inspecting all adjacent nodes, decrement the hop count by 1 ($h=h_f-1$).
4. Inspect all nodes k that are two hops away from destination node j.
5. Mark all links kl as principal if $D_K(k,h_f-2)+d'_{kl}$ is less than $P_T(l)$.
6. Define a new length threshold for node k such that $P_T(k)=P_T(l)-d'_{kl}$.
7. Repeat steps (1) through (6) until the hop count is equal to zero. At this time, all principal links have been identified.

Principal Link Identification Pseudocode

```
                              /*-----Initialization-----*/
Principal = φ
for (l=0;l < N;l++)
{
      P_T(l) = 0
}
P_T(j) = P_T
                         /*-----Decrement Hop Count-----*/
for (h = h_f;h > 0;h--)
{
      PrinLinks = {}; /*Initialize the Principal Link List to
                                          an empty list*/
      for (l = 0;l < N;l++)
      {
            for (k=0;k < N;k++)
            {
                  if (A'(k,l) = 1) then
                  {
                        if (D_l(k,h-1) + d_kl < P_T(l)) then
                        {
                              PrinLinks = PrinLinks ∪ {(k,l)}
                        }
                  }
            }
      }
      Principal = Principal ∪ PrinLinks;
            /* Now update the accumulated delay maxima P_T */
      for (k,l) in PrinLinks
      {
            P_T(k) = max[P_T(k), P_T(l) - d'_kl];
      }
}
return Principal;
```

What is claimed is:

1. A packet communications system comprising
a first plurality of packet switching nodes for receiving and sending data packets in said system,
a second larger plurality of transmission links interconnecting pairs of said packet switching nodes,
means for determining optimum routes through said communications system between a packet originating node in said system and a packet destination node in said system, said means for determining optimum routes comprising
means for identifying principal paths between said originating node and said utilizing node, said principal paths each including a minimal hop count and, if more than one principal path has the the same minimal hop count, the one having a minimal transmission delay, where a hop is a single one of said transmission links in said principal path,
means utilizing said principal path identifications for determining an optimal path between said originating and destination nodes, and
means for accepting said optimal path only if said optimal path also has a transmission delay below a preselected threshold.

2. The packet communications system according to claim 1 wherein
said means for determining optimal paths includes means for utilizing a Bellman-Ford algorithm.

3. The packet transmission system according to claim 1 wherein said means for determining an optimal path comprises
means for weighing each said transmission link in accordance with a weighing function dependent on the non-allocated bandwidth available in the corresponding one of said transmission links.

4. The packet transmission system according to claim 3 wherein said means utilizing said principal path identifications comprises means for providing a larger effective bandwidth for links when in said principal paths than for links when not in said principal paths.

5. The packet transmission system according to claim 1 wherein said means for determining principal paths comprises
means for weighing each said transmission link according to the equation $$d_{kl} = \frac{C_{kl}}{(C_{kl} - \hat{C}_{kl}^{(1)})(C_{kl} - \hat{C}_{kl}^{(2)})}$$

where
$d_{kl}$ is the incremental delay between nodes k and l,
$C_{kl}$=total bandwidth of said transmission link from Node k to l,
$\hat{C}_{kl}^{(1)}$=already allocated bandwidth before this route, and
$\hat{C}_{kl}^{(2)}$=allocated bandwidth after this route.

6. A route controller for a packet communications system comprising packet switching nodes interconnected by transmission links comprising
means for identifying principal paths between an originating node and a destination node in said system, said principal paths each including a minimal hop count, and, if two or more of said principal paths have the same minimal hop count, the path also having a minimal transmission delay, where a hop is a single one of said transmission links in said principal path.
means, responsive to said means for identifying principal paths, for determining an optimal path through said communications system between said originating and destination nodes, and
means for accepting said optimal path only if said optimal path has a transmission delay below a preselected threshold.

7. The route controller according to claim 6 wherein said means for identifying principal paths includes means for utilizing a Bellman-Ford algorithm.

8. The route controller according to claim 6 wherein said means for identifying principal paths comprises
means for weighing each said transmission link in accordance with a weighing function dependent on the non-allocated bandwidth available in the corresponding one of said transmission links.

9. The route controller according to claim 8 wherein said means responsive to said means for identifying principal paths comprises means for specifying a larger effective bandwidth for links when in said principal paths than for links when not in said principal paths.

10. The route controller according to claim 6 wherein said means for identifying principal paths comprises
means for weighing each said transmission link according to the equation $$d_{kl} = \frac{C_{kl}}{(C_{kl} - \hat{C}_{kl}^{(1)})(C_{kl} - \hat{C}_{kl}^{(2)})}$$

where $d_{kl}$ is the incremental delay between nodes k and l,
$C_{kl}$ = total bandwidth of said transmission link from Node k to l,
$\hat{C}_{kl}^{(1)}$ = already allocated bandwidth before this route, and
$\hat{C}_{kl}^{(2)}$ = allocated bandwidth after this route.

11. A method for determining routes in a packet communications system comprising the steps of
interconnecting a first plurality of packet switching nodes for receiving and sending data packets in said system with a second larger plurality of transmission links,
identifying principal paths between an originating node and a destination node in said system, each said principal path including a minimal hop count and, if two or more of said principal paths include the same minimal hop count, the path also having a minimal transmission delay, where a hop is a single one of said transmission links in said principal path.
utilizing said principal path identifications for determining an optimal path between said originating and destination nodes, and
accepting said optimal path only if said optimal path has a transmission delay below a preselected threshold.

12. The method according to claim 11 wherein said step of identifying principal paths includes the step of utilizing a Bellman-Ford algorithm.

13. The method according to claim 11 wherein said step of identifying principal paths comprises the step of
weighing each said transmission link in accordance with a weighing function dependent on the non-allocated bandwidth available in the corresponding one of said transmission links.

14. The method according to claim 13 wherein said step of utilizing said principal path identifications comprises the step of
specifying a larger effective bandwidth for links when in said principal paths than for links when not in said principal paths.

15. The method according to claim 11 wherein said step of identifying principal paths comprises the step of
means for weighing each said transmission link according to the equation $$d_{kl} = \frac{C_{kl}}{(C_{kl} - \hat{C}_{kl}^{(1)})(C_{kl} - \hat{C}_{kl}^{(2)})}$$

where $d_{kl}$ is the incremental delay between nodes k and l,
$C_{kl}$ = total bandwidth of said transmission link from Node k to l,
$\hat{C}_{kl}^{(1)}$ = already allocated bandwidth before this route, and
$\hat{C}_{kl}^{(2)}$ = allocated bandwidth after this route.

* * * * *